Figure 1:
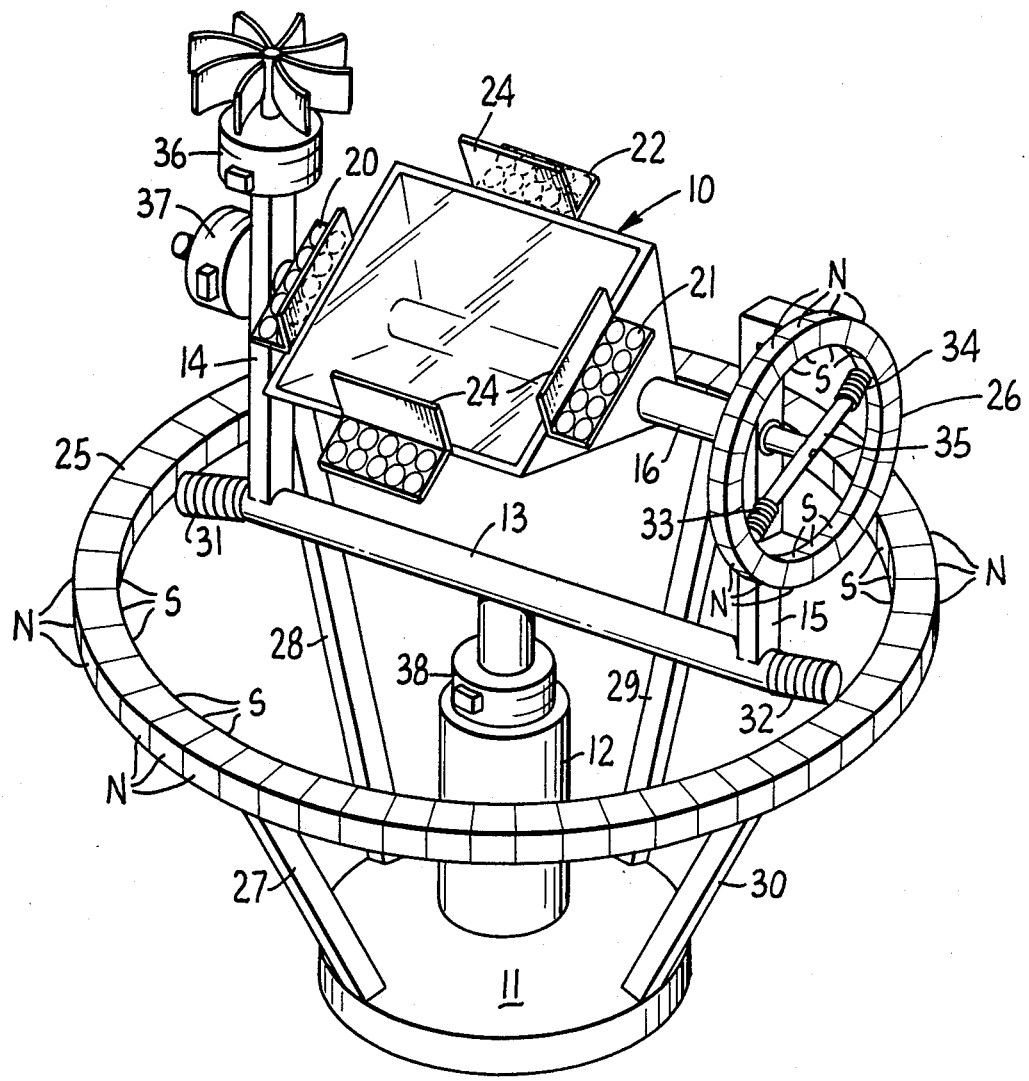

United States Patent [19]

Himes

[11] 4,328,417
[45] May 4, 1982

[54] SOLAR TRACKING MECHANISM
[76] Inventor: Roger Himes, 2000 Lucas Valley Rd., San Rafael, Calif. 94903
[21] Appl. No.: 170,525
[22] Filed: Jul. 21, 1980
[51] Int. Cl.³ .............................................. G01J 1/20
[52] U.S. Cl. ................................ 250/203 R; 310/46; 310/306
[58] Field of Search .................... 250/203 R; 126/425; 310/46, 306

[56] References Cited
U.S. PATENT DOCUMENTS
4,179,612 12/1979 Smith ............................ 250/203 R

*Primary Examiner*—David C. Nelms
*Assistant Examiner*—Darwin R. Hostetter
*Attorney, Agent, or Firm*—Ernest M. Anderson

[57] ABSTRACT

A mechanism for tracking the sun and positioning a solar energy collector, photovoltaic cells being utilized to energize pairs of electric coils rotatably mounted within magnetic rings. When the sun's rays fall upon a bank of photovoltaic cells a pair of coils are energized, setting up electromotive forces in opposition to the force field of the magnetic ring, and rotating the coils and solar collector mounted thereto.

4 Claims, 2 Drawing Figures

U.S. Patent     May 4, 1982     4,328,417

SOLAR TRACKING MECHANISM

SUMMARY OF THE INVENTION

This invention relates generally to solar tracking mechanisms of the type commonly used to position a solar energy collector facing the direct rays of the sun as it moves from east to west. Novelty of the invention resides in the use of photo voltaic cells for energizing one or more coils rotatably mounted within a magnetic ring. When the sun's rays fall upon a bank of photo voltaic cells, the coil or coils are energized, setting up an electro motive force in opposition to the force field of the magnetic ring, thereby rotating the coils and a solar collector mounted thereto.

STATE OF THE PRIOR ART

Sun tracking devices are presently known which are used in conjunction with solar heat collectors for positioning the collector relative to the sun as it moves across the sky. In some instances the solar heat collectors are mounted upon both vertical and horizontal axes and are pivoted upon such axes to permit focusing of the sun's rays upon the collector. A plurality of light sensitive photo cells have been utilized to sense the position of the sun and operate motor control circuits for moving the solar collector upon one or both axes. Such a device is taught in U.S. Pat. No. 4,100,915. Similar and related teachings are found in U.S. Pat. No. 4,146,784, which features four solar detectors arranged in pairs and mounted for tracking the sun's movement. Both prior art systems utilize an external power source (i.e., batteries) to operate electric motors.

It is a primary object of the present invention to improve upon the known and existing devices for tracking the sun, utilizing photo voltaic cells which both sense and provide energy for moving the solar collector.

A more specific object of the invention is to provide and improve drive means for pivotally moving a solar collector upon a pair of axes, one horizontally disposed and the other vertically arranged.

Other objects of this invention will become apparent in view of the following detailed description and the accompanying drawings.

Figure 2:
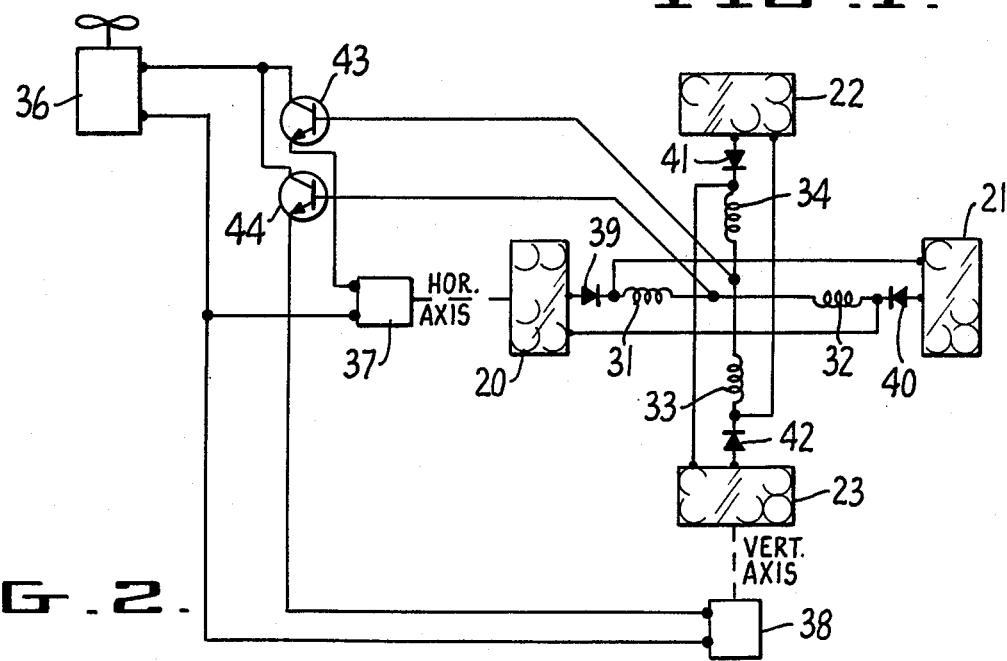

In the drawings forming a part of this application and in which like parts are identified by like reference numerals, FIG. 1 is a perspective view of a preferred embodiment of the invention in a solar tracking device; and FIG. 2 is a schematic diagram and circuit for operating the device of FIG. 1.

Referring to FIG. 1 in particular, there is shown a solar collector device 10 supported for pivotal movement on a pair of axes, one disposed vertically and the other horizontally. More particularly, collector 10 is supported upon a platform or base 11 by mounting structure comprising a pedestal 12, a horizontal support arm 13 rotatably mounted by bearings (not shown) on a vertical axis, a pair of spaced-apart upright supports 14 and 15, and a shaft 16 rotatably mounted by bearings (not shown) on a horizontal axis between said supports. Four batteries of photo voltaic cells, 20, 21, 22 and 23 are arranged in pairs on opposite sides of solar collector 10. Batteries 20 and 21 sense the sun's rays to the right and left of direct focus upon the solar collector; and batteries 22 and 23 sense the sun's rays when directed either above or below collector 10. A sun visor or shield 24 is provided to one side of each battery. Such shielding protects the associated battery of cells from contact or exposure to the sun's rays approaching from across collector 10 at an angle.

A pair of circular, ring-shaped magnets 25 and 26 provide force fields for moving collector 10 upon its vertical and horizontal support axes. More particularly, a large ring magnet 25 is supported from platform 11 upon a set of four legs 27, 28, 29 and 30. Magnet 25 is horizontally disposed and coaxial relative to the vertical pivot axis of arm 13. Ring magnet 26 is mounted from upright 15 in a substantially vertical plane coaxially relative to shaft 16.

Two pairs of electro magnets are provided for moving frame 10 relative to the vertical and horizontal pivot axes. More particularly, a first pair of electro magnets 31 and 32 are mounted to the ends of arm 13. These magnets cooperate with ring magnet 25, and depending upon the direction of current flow through the coils, if any, the opposing (or attracting) magnetic forces rotate arm 13 upon its vertical axis. Similarly, a pair of electro magnets 33 and 34 cooperate with ring magnet 26, said electro magnets being mounted on the ends of an armature 35 connected to shaft 16.

Means is provided for inhibiting rotation of collector 10 upon its pivot axes by wind forces, except when being moved by the magnet forces. For this purpose a vane-driven generator 36 is mounted upon the upper end of upright 14. The output of generator 36 connects to a pair of electric brakes 37 and 38, said brakes being adapted for inhibiting rotation of shaft 16 and support armature 13, respectively.

Referring to FIG. 2, the four batteries of photo voltaic cells 20, 21, 22, and 23 are connected by an electric circuit for energizing coils 31, 32, 33 and 34. A first double loop circuit interconnects batteries 20 and 21 with coils 31 and 32, a pair of crystal diodes 39 and 40 restricting and directing the flow of current depending upon which of the two batteries, if either, is in direct view of the sun and producing a current flow. A second double loop circuit interconnects batteries 22 and 23 with coils 33 and 34, a second pair of crystal diodes 41 and 42 restricting and directing the flow of current to the coils.

Vane-driven generator 36 is connected to electric brakes 37 and 38 by a circuit including a pair of electronic switches 43 and 44, electronic switch 43 and brake 37 being electrically connected in series with each other and in parallel with series connected electronic switch 44 and brake 38. Switches 43 and 44 are controlled in response to current flows through coils 31, 32, 33 and 34. In the event that collector 10 is directly aimed at the sun then of course none of the batteries will be exposed to direct rays of the sun and no current flows through any of the coils. If, however, there is a substantial wind blowing generator 36 will produce a current flow energizing brakes 37 and 38 through electronic switches 43 and 44. However, should one of the batteries of photo voltaic cells be exposed to the sun and energize an associated pair of coils, the base of that electronic switch which is connected to the circuit between the activated coils will become positive, shutting off the switch. This results in a de-energization of the associated brake, allowing the electro motive force of the coils to interact with the magnet field of the associated ring magnet, thereby rotating or pivoting collector 10 upon the axis controlled by the battery of cells. As an example, if the rays of the sun were to fall upon battery 20, coils 31 and 32 would be energized through crystal diode 39. The base of electronic switch 44 would thereupon become positive shutting off any current flow between generator 36 and brake 38.

Although a preferred embodiment of the invention has been illustrated and described, various modifications and changes may be resorted to without departing from the spirit of the invention or the scope of the appended claims, and each of such modifications and changes is contemplated.

What is claimed is:

1. A solar tracking mechanism comprising:

light response means comprising four batteries of photo voltaic cells, a first battery of cells being focused for sensing light to the right of the sun, a second battery of cells being focused for sensing light to the left of the sun, a third battery of cells being focused for sensing light below the sun, and a fourth battery of cells being focused for sensing light above the sun;

means for mounting said light sensitive means for pivotal rotation upon a pair of mutually perpendicular axes, one of said pair of axes being vertical and fixed, the other axis being mounted for pivotal rotation upon the fixed axis;

means for rotating said light sensitive means upon said vertical and fixed axis comprising a first ring of permanent magnets having a common polarity on the inside and the opposite polarity on the outside, said first ring being mounted in a horizontal plane coaxial relative to said vertical and fixed axis, and a first pair of coils disposed within said first ring and mounted for pivotal rotation within said first ring upon said vertical and fixed axis;

means for rotating said light sensitive means upon said other axis comprising a second ring of permanent magnets having a common polarity on the inside and the opposite polarity on the outside, said second ring being mounted in a vertical plane coaxial relative to said other axis and movable therewith, a second pair of coils disposed within said second ring and mounted for pivotal rotation within said second ring; and means electrically connecting said first and second pairs of coils with said light responsive means, said first pair of coils being rotated within said first ring when either said first or second battery of cells receives light from the sun, said second pair of coils being rotated within said second ring when either said third or fourth battery of cells receives light from the sun.

2. The sun tracking mechanism of claim 1 and further comprising means for inhibiting pivotal rotation of said light sensitive means upon either of said pair of axes.

3. The sun tracking mechanism of claim 2, said means for inhibiting pivotal rotation comprising a pair of electrically operated brakes secured upon said pair of axes, respectively.

4. The sun tracking mechanism of claim 3, and further comprising means for energizing said pair of electrically operated brakes including a wind-driven generator, and means for de-energizing at least one of said pair of electrically operated brakes when the light responsive means is to be rotated upon said pair of axes or one of said pair of axes.

* * * * *